US011833094B2

(12) United States Patent
Karlsson et al.

(10) Patent No.: US 11,833,094 B2
(45) Date of Patent: Dec. 5, 2023

(54) LIFT UNIT DOCKING SYSTEMS

(71) Applicant: Liko Research & Development AB, Luleå (SE)

(72) Inventors: Roger Karlsson, Rosvik (SE); Göran Eriksson, Luleå (SE); Marcus Linde, Öjebyn (SE); Elin Dovervik, Luleå (SE); Johanna Sundqvist, Gammelstad (SE); Åsa Lundström, Luleå (SE)

(73) Assignee: Liko Research & Development AB, Lulea (SE)

( * ) Notice: Subject to any disclaimer, the term of this patent is extended or adjusted under 35 U.S.C. 154(b) by 1273 days.

(21) Appl. No.: 16/381,556

(22) Filed: Apr. 11, 2019

(65) Prior Publication Data

US 2019/0314235 A1   Oct. 17, 2019

Related U.S. Application Data

(60) Provisional application No. 62/658,192, filed on Apr. 16, 2018.

(51) Int. Cl.
*A61G 7/10* (2006.01)
*B62B 3/02* (2006.01)
(Continued)

(52) U.S. Cl.
CPC ......... *A61G 7/1073* (2013.01); *A61G 7/1042* (2013.01); *B62B 3/02* (2013.01); *B62B 3/04* (2013.01); *B66C 7/08* (2013.01); *B66C 13/00* (2013.01); *B66C 19/00* (2013.01); *B62B 2203/20* (2013.01); *B66C 7/16* (2013.01)

(58) Field of Classification Search
CPC .... A61G 7/1042; A61G 7/1073; B62B 3/008; B62B 3/02; B62B 3/04; B62B 5/0063; B62B 11/00; B62B 2203/20; B66C 7/02; B66C 7/08; B66C 7/16; B66C 11/12; B66C 13/00; B66C 19/00
See application file for complete search history.

(56) References Cited

U.S. PATENT DOCUMENTS 10,118,632 B2 * 11/2018 Carzola ............... B62B 3/004
11,013,654 B2 * 5/2021 Wallin ................ A61G 7/1042
(Continued)

FOREIGN PATENT DOCUMENTS

CN  202919552 U  *  5/2013
CN  108217469 A  *  6/2018 .............. B66C 1/14
(Continued)

*Primary Examiner* — David R Hare
(74) *Attorney, Agent, or Firm* — Dinsmore & Shohl LLP

(57) ABSTRACT

A lift unit docking system includes a docking rail, a docking rail adapter, and a locking mechanism. The docking rail is configured to provide ingress and egress of a lift unit to and from an overhead rail, and includes a body defining a channel and an adapter receiving opening within the body. The docking rail adapter is repositionable relative to the adapter receiving opening of the docking rail and is configured to transport the lift unit into and out of the channel of the docking rail. The locking mechanism is repositionable between a locked position and an unlocked position, wherein the locking mechanism extends into the channel to block movement of a mounted lift unit toward the adapter receiving opening of the docking rail when in the locked position.

13 Claims, 12 Drawing Sheets

(51) Int. Cl.
*B62B 3/04* (2006.01)
*B66C 7/08* (2006.01)
*B66C 13/00* (2006.01)
*B66C 19/00* (2006.01)
*B66C 7/16* (2006.01)

(56) References Cited

U.S. PATENT DOCUMENTS

2018/0344554 A1* 12/2018 Wallin ................ A61G 7/1042
2019/0314235 A1* 10/2019 Karlsson .................. B62B 3/02

FOREIGN PATENT DOCUMENTS

| | | | | |
|---|---|---|---|---|
| DE | 3636440 C1 | 10/1987 | | |
| JP | 09028741 A | 2/1997 | | |
| JP | 10286288 A | * 10/1998 | | |
| JP | 10286288 A | 10/1998 | | |
| JP | 2009275426 A | * 11/2009 | | |
| WO | 2011059339 A1 | 5/2011 | | |
| WO | WO-2015086483 A1 * | 6/2015 | ........... | A47B 88/493 |
| WO | WO-2017059526 A1 * | 4/2017 | ........... | A61G 7/1015 |
| WO | WO-2018201232 A1 * | 11/2018 | ........... | A61G 7/1001 |

* cited by examiner

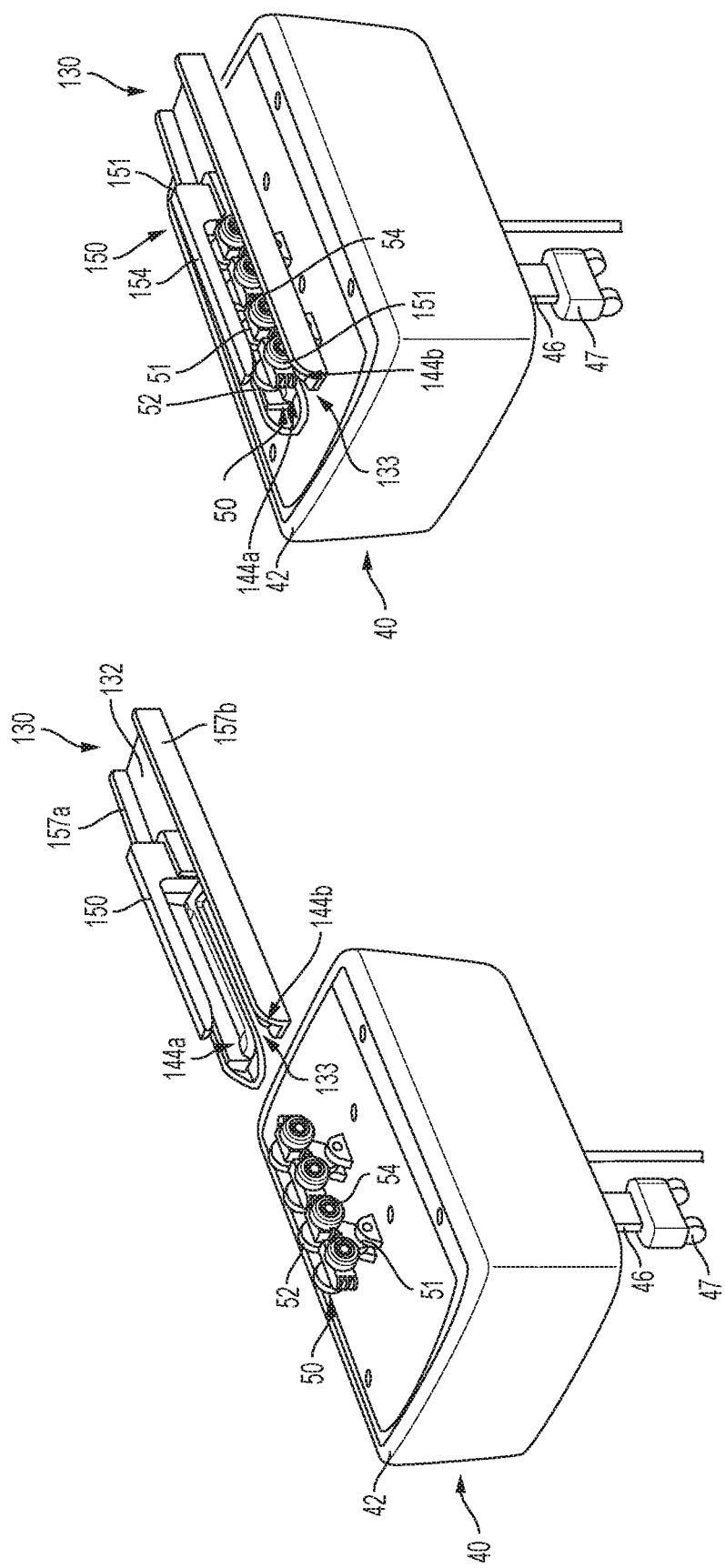

LIFT UNIT DOCKING SYSTEMS

CROSS-REFERENCE TO RELATED APPLICATIONS

This application claims the benefit of priority to U.S. Provisional Application No. 62/658,192, entitled "Lift Unit Docking Systems," filed Apr. 16, 2018, hereby incorporated by reference in its entirety.

TECHNICAL FIELD

The present specification generally relates to overhead lift systems, and, more specifically, to lift unit docking systems for mounting and dismounting lift units on an overhead rail.

BACKGROUND

Overhead lifting devices, or lift units, such as subject lifts used in the health care industry, may generally be coupled to an overhead rail system with a carriage which facilitates positioning the lift unit with respect to an overhead rail. Sometimes it may be desirable to dismount the lift unit from the overhead rail system and transport the lift unit to a different overhead rail system that may not be connected to the first overhead rail system. Alternatively, it may be necessary to dismount the lift unit from the overhead rail system to service the lift unit. Because the lift units are generally suspended well-above the ground on the overhead rail system, ladders or other such structures may be required to allow an operator or service person to reach the lift unit to manually remove it from the overhead rail. However, climbing up and down a ladder may be undesirable.

Accordingly, a need exists for lift unit docking systems for mounting and dismounting lift units on an overhead rail.

SUMMARY

In one embodiment, a lift unit docking system includes a docking rail, a docking rail adapter, and a locking mechanism. The docking rail is configured to provide ingress and egress of a lift unit to and from an overhead rail, and includes a body defining a channel and an adapter receiving opening within the body. The docking rail adapter is repositionable relative to the adapter receiving opening of the docking rail and is configured to transport the lift unit into and out of the channel of the docking rail. The locking mechanism is repositionable between a locked position and an unlocked position, wherein the locking mechanism extends into the channel to block movement of a mounted lift unit toward the adapter receiving opening of the docking rail when in the locked position.

In another embodiment, a lift unit docking system includes a docking rail, a docking rail adapter, and a vertical lifter. The docking rail adapter is configured to provide ingress and egress of a lift unit to and from an overhead rail. The docking rail includes a body and an adapter receiving opening within the body, wherein the body defines a channel and the adapter receiving opening provides access to the channel. The docking rail adapter is repositionable relative to the adapter receiving opening of the docking rail and is configured to transport the lift unit into and out of the channel of the docking rail. The vertical lifter is configured to vertically lift the docking rail adapter to the adapter receiving opening of the docking rail.

In yet another embodiment, a lift unit docking system includes a docking rail, a docking rail adapter, a locking mechanism, and a vertical lifter. The docking rail adapter is configured to provide ingress and egress of a lift unit to and from an overhead rail. The docking rail includes a body defining a channel and an adapter receiving opening within the body. The docking rail adapter is repositionable relative to the adapter receiving opening of the docking rail and is configured to transport the lift unit into and out of the channel of the docking rail. The locking mechanism is repositionable between a locked position and an unlocked position, wherein the locking mechanism extends into the channel to block movement of a mounted lift unit toward the adapter receiving opening of the docking rail when in the locked position. The vertical lifter is configured to vertically lift the docking rail adapter to the adapter receiving opening of the docking rail.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

FIG. 5A illustrates a lift unit unloaded from the docking adapter of FIG. 4, according to one or more embodiments shown and described herein;

FIG. 5B illustrates the lift unit supported on the docking adapter of FIG. 4, according to one or more embodiments shown and described herein;

DETAILED DESCRIPTION

Embodiments disclosed herein include lift unit docking systems that allow for lift units, such as subject lift units used in care settings such as hospitals for example, to be mounted and dismounted from overhead rails of overhead lift systems. Specifically, embodiments described herein include a docking rail configured to provide ingress and egress of a lift unit to and from an overhead rail and a docking rail adapter. The docking rail includes an adapter receiving opening and the docking rail adapter is repositionable relative to the adapter receiving opening and is configured to transport the lift unit into and out of docking rail. For example, a lift unit may be supported on the docking rail adapter and lifted to a height of and inserted into the docking rail by the docking rail adapter. For example, the docking rail adapter may be coupled to a telescoping column capable of lifting and lowering the docking rail adapter to and from the docking rail. Accordingly, the lift unit can be lowered to height below the overhead rail without a need for an operator to climb to a height of the overhead rail to manually remove a lift unit 40 from an overhead rail. Various embodiments of the lift unit docking systems will be described in more detail herein with specific reference to the corresponding drawings.

Figure 1:
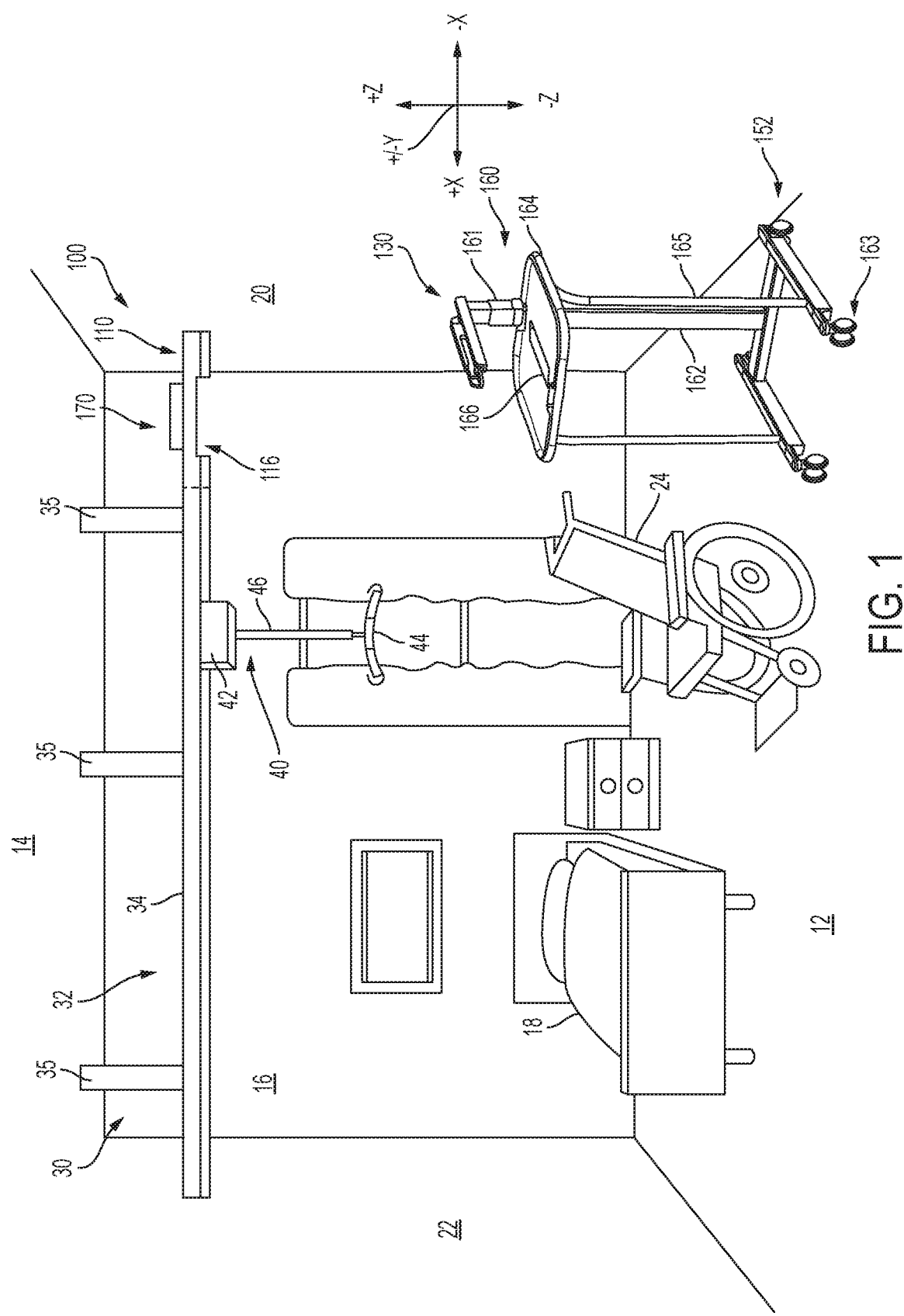
FIG. 1 schematically depicts a perspective view of a room showing elements of an overhead lift system, according to one or more embodiments shown and described herein.

As used herein, the term "longitudinal direction" refers to the +/−X direction depicted in FIG. 1. The term "lateral direction" refers to the +/−Y direction depicted in FIG. 1, which is perpendicular to the longitudinal direction. The term "vertical direction" refers to the +/−Z direction which is perpendicular to both the longitudinal direction and the lateral direction.

FIG. 1 depicts a care room having a floor 12, a ceiling 14, and architectural walls 16, 20, 22. The care room may also include a fourth wall (not shown). Such care rooms may include various objects such as a bed 18, a wheel chair 24, and the like. As illustrated, the care room may include an overhead lift system 30 that may be used, for example, to transport a subject to various locations within the care room or elsewhere in the facility. In the embodiments described herein, the overhead lift system 30 may include a lift unit 40, an overhead rail 32, and a lift unit docking system 100. These and additional features of the overhead lift system 30 will be described in greater detail herein.

Figure 2:
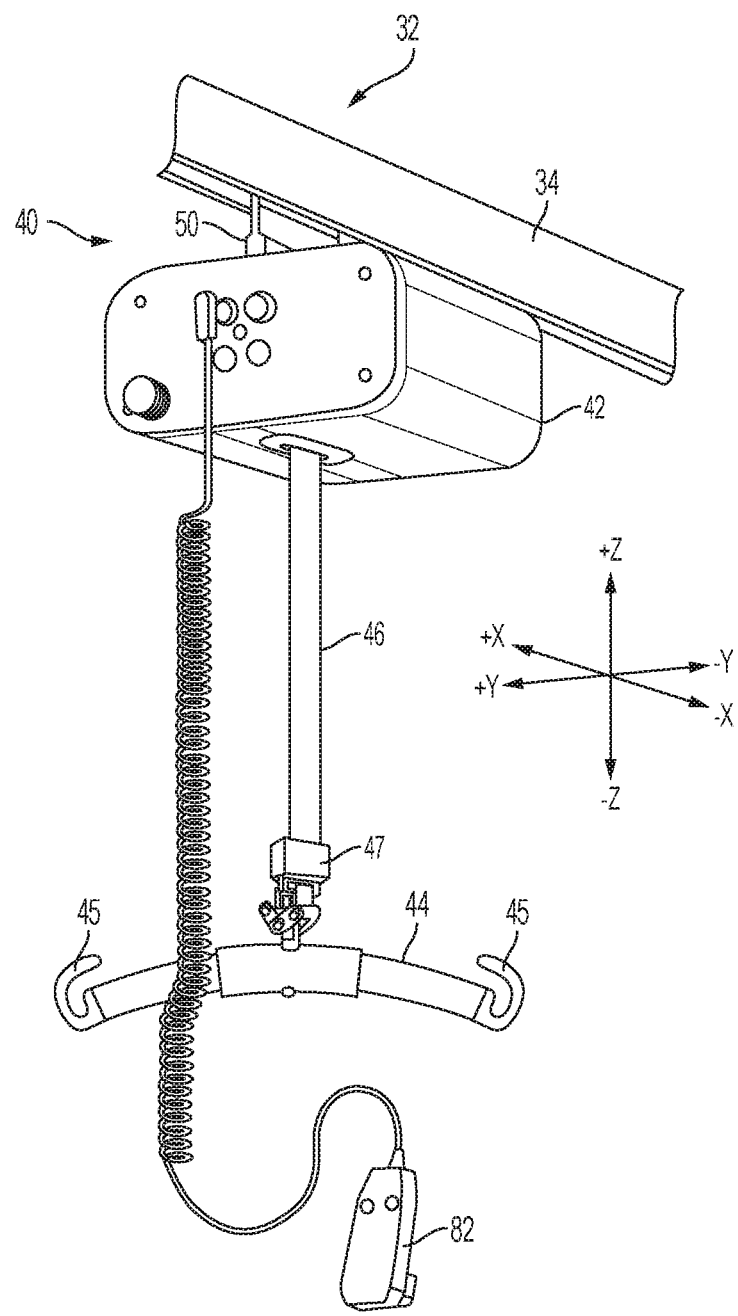
FIG. 2 schematically depicts a lift unit of the overhead lift system of FIG. 1, according to one or more embodiments shown and described herein.

Referring to FIG. 2, the exemplary lift unit 40 is schematically depicted. As will be described in greater detail herein, the lift unit 40 is configured to be slidably engaged with and travel along the overhead rail 32 to transport a subject coupled to the lift unit 40. The lift unit 40 includes a lift motor 42 and a lift carriage 50 that engages the overhead rail 32 such that the lift unit 40 is translatable there along on support wheels (e.g., support wheels 52, 54 illustrated in FIGS. 6A and 6B). In some embodiments, the lift motor 42 (or a separate motor) may be operatively coupled to the support wheels of the lift carriage 50 to cause the support wheels to rotate such that the lift unit 40 is capable of translating across the overhead rail 32. In some embodiments, the support wheels may not be motorized and the lift unit 40 may be moved manually. The lift motor 42 may include a power supply such as a battery or other voltage source (not shown).

The lift unit 40 may further include a strap or tether 46 that extends vertically downward from the lift motor 42. The lift motor 42 may be operatively coupled to the tether 46 such that the lift motor 42 can cause a length of the tether 46 to extend or retract from the lift unit 40. A sling bar 44 having hooks 45 is attached to the end of the tether 46 distal from the lift motor 42 by a connector 47. A caregiver or other user can use the lift unit 40 to raise and lower a subject. For example, the lift unit 40 can also be used to raise and lower a subject by securing the subject in a sling (not shown), attaching the sling to the sling bar 44 hooks 45, and using a control device 82 (such as a hand control) to operate the lift motor 42. The control device 82 may be configured to control a payout length of the tether 46. Once the subject is in a raised positioned, the subject may be conveyed along the overhead rail 32 either manually, or by using the control device 82 to regulate the motion of the lift unit 40 with respect to the overhead rail 32.

Referring again to FIG. 1, the overhead rail 32 is depicted. As illustrated, the overhead rail 32 may be secured to the ceiling 14 of the care room. Specifically, the overhead rail 32 may be secured to structural elements of the ceiling 14, such as ceiling joists, by suitable fastening elements. In some embodiments, the overhead rail 32 may be suspended from the ceiling 14 of the care room by pendants 35. In other embodiments, it is contemplated that the overhead rail 32 may be directly secured to the ceiling 14. The overhead rail 32 includes a subject support rail 34 and a docking rail 110 that, as will be described in greater detail herein, forms a portion of the lift unit docking system 100. It is noted that though the docking rail 110 is illustrated as being positioned at an end of the overhead rail 32, the docking rail 110 may be positioned anywhere along the overhead rail 32. The docking rail 110 may be integrally formed with the subject support rail 34 or the docking rail 110 may be an entirely separate component couplable to the subject support rail 34.

Figure 3A:
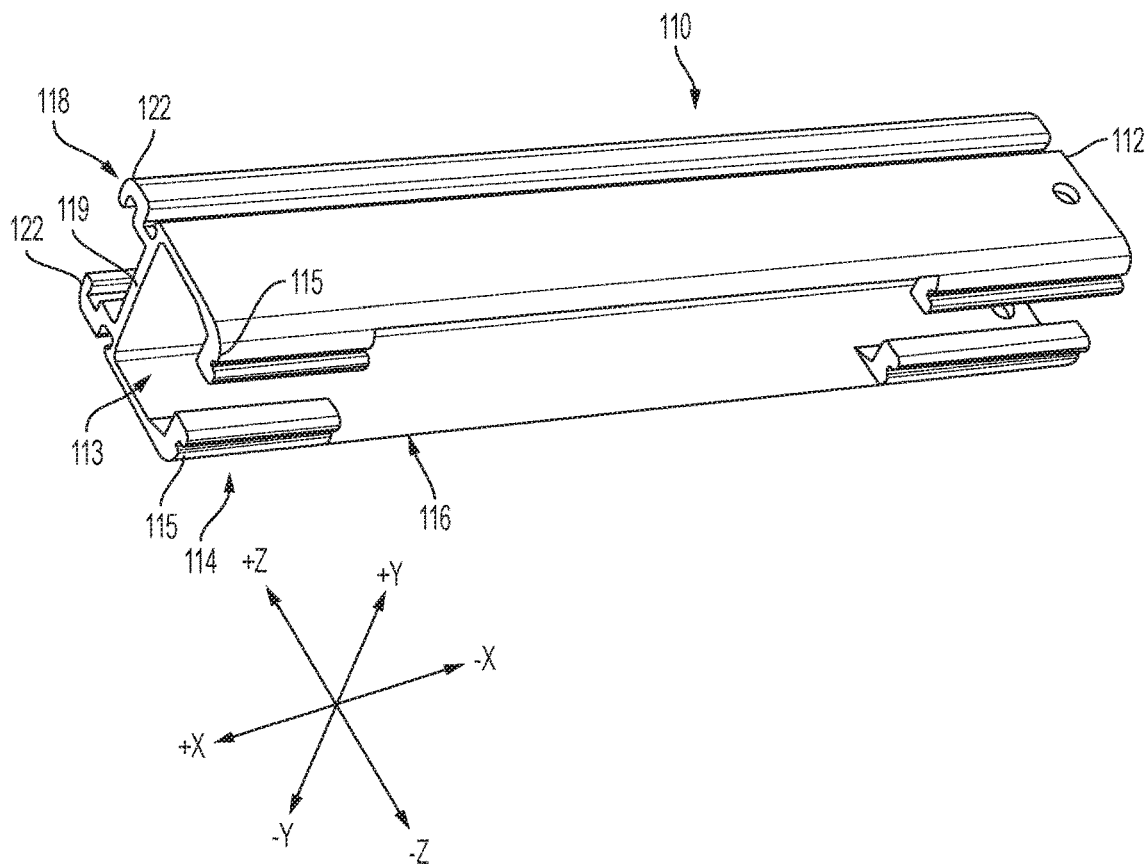
FIG. 3A depicts a bottom perspective view of a docking rail, according to one or more embodiments shown and described herein.
Figure 3B:
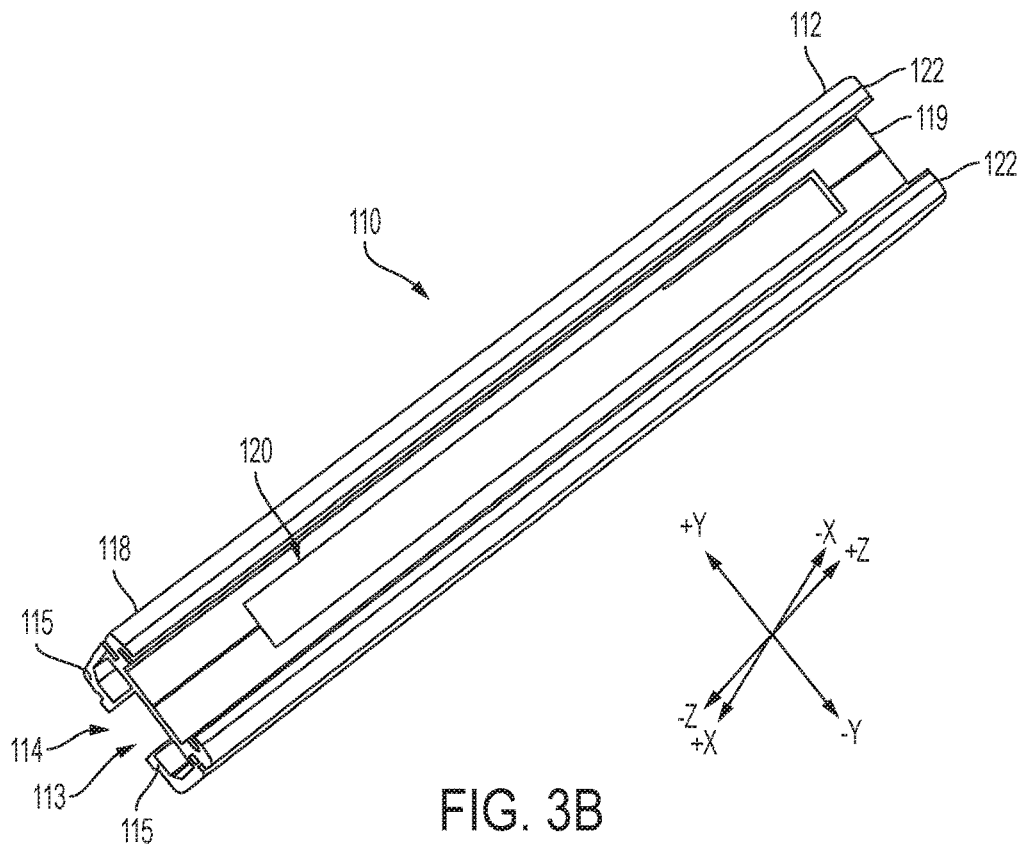
FIG. 3B depicts a top perspective view of the docking rail of FIG. 3A, according to one or more embodiments shown and described herein.

FIGS. 3A and 3B illustrate the docking rail 110 in isolation from the subject support rail 34. The docking rail 110 is configured to provide a location of ingress and egress for the lift unit 40 to and from the overhead rail 32, shown in FIG. 1. The docking rail 110 includes a body 112 and an adapter receiving opening 116 within the body 112. The body 112 of the docking rail 110 defines a channel 113 that extends longitudinally through the body 112. As will be described in greater detail herein, the adapter receiving opening 116 provides access to the channel 113 for a lift unit 40, such as illustrated in FIG. 2, to be inserted and/or removed from the overhead rail 32.

The body 112 of the docking rail 110 may further define a bottom rail portion 114, an upper rail portion 118, and an upper wall 119 positioned between the bottom rail portion 114 and the upper rail portion 118 in the vertical direction. The bottom rail portion 114 may include support flanges 115 to support the lift carriage 50 of the lift unit 40 thereon within the channel 113. The adapter receiving opening 116 may extend through support flanges 115 such that the support flanges 115 are discontinuous along a length of the body 112 of the docking rail 110 in the longitudinal direction. As will be described in greater detail herein, the upper rail portion 118 may act as a retainer for a locking mechanism 170 (see FIG. 8). For example, the upper rail portion 118 may include retaining flanges 122. The upper wall 119 may define an upper extent of the channel 113 in the vertical direction and provide separation between the upper rail portion 118 and the bottom rail portion 114. The docking rail 110 may further include a lock opening 120 (shown in FIG. 6B) formed within the upper wall 119 that is positioned parallel to and opposite from the adapter receiving opening 116.

Referring again to FIG. 1, the lift unit docking system 100 may include a docking rail adapter 130, a vertical lifter 160, and a locking mechanism 170 in addition to the docking rail 110.

Figure 4:
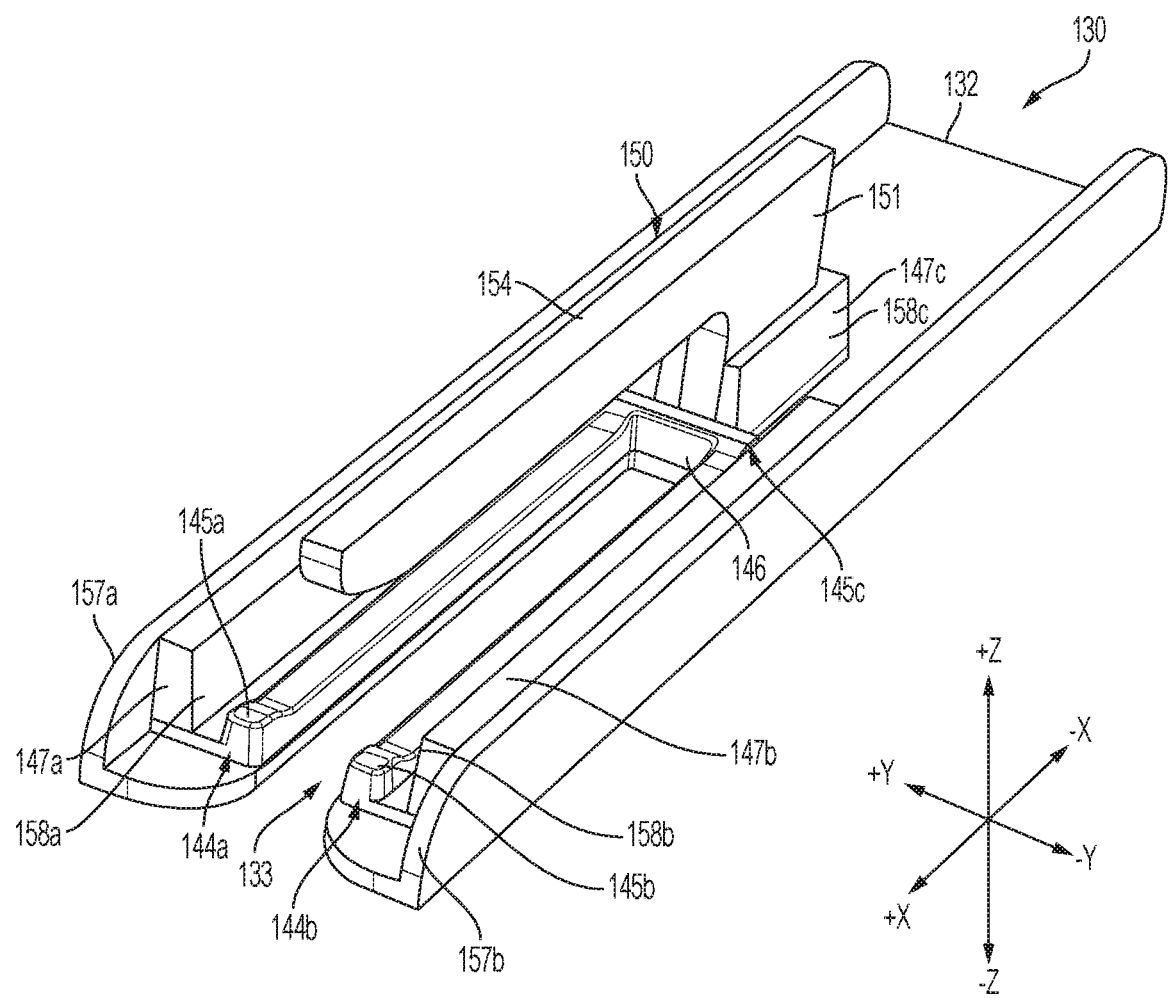
FIG. 4 depicts a perspective view of a docking adapter, according to one or more embodiments shown and described herein.

The docking rail adapter 130 is configured to be repositionable relative to the adapter receiving opening 116 of the docking rail 110 and to transport the lift unit 40 into and out of the channel 113 of the docking rail 110 through the adapter receiving opening 116. Accordingly, the docking rail adapter 130 may provide a rigid structure capable of supporting the lift unit 40 thereon. Referring to FIG. 4, the docking rail adapter 130 may include a base 132 and a carrier wheel track positioned on the base 132. For example, the docking rail adapter 130 includes a first carrier wheel track 144a and a second carrier wheel track 144b separated by a lift unit carrier channel 133 extending through the base 132. The first and second carrier wheel tracks 144a, 144b may be connected to one another by a connecting strip 146 extending along an end of the lift unit carrier channel 133. That is, the carrier wheel track may extend around the lift unit carrier channel 133 to form the first and second carrier wheel tracks 144a, 144b. The carrier wheel track may further include a raised portion positioned at at least one end of the carrier wheel track. For example, a raised portion 145a, 145b may be positioned at a terminal end of each of the first and second carrier wheel tracks 144a, 144b. Some embodiments, such as shown in FIG. 4, may include a raised portion 145a, 145b at the terminal end of each of the first and second carrier wheel tracks 144a, 144b and a raised portion 145c along the connecting strip 146, such that the carrier wheel track appears sunken longitudinally between the raised portions 145a, 145b, and 145c.

FIGS. 5A and 5B illustrate a lift unit 40 moving from an unmounted position (FIG. 5A), off of the docking rail adapter 130, to a mounted position (FIG. 5B) wherein the lift unit 40 is positioned on the docking rail adapter 130. In the illustrated embodiment, the lift carriage 50 of the lift unit 40 includes a carriage body 51 a first set of wheels 52 and a second set of wheels 54 rotatively mounted on either side of the carriage body 51 such that the carriage body 51 extends longitudinally between the first set of wheels 52 and the second set of wheels 54. It is noted that though each set of wheels 52, 54 are illustrated with four wheels, a greater or fewer number of wheels for each set of wheels 52, 54 are contemplated and possible. For example, each set of wheels 52, 54 may have as few as a single wheel. When mounted on the docking rail adapter 130, the first set of wheels 54 sits on the first carrier wheel track 144a and the second set of wheels 52 sits on the second carrier wheel track 144b. The carriage body 51, accordingly, sits within the lift unit carrier channel 133. The raised portions 145a, 145b of the carrier wheel track may act as a barrier to aid in maintaining the lift unit's 40 positioning on the first and second carrier wheel tracks 144a, 144b. Accordingly, unintended motion of the lift unit 40 from the first and second carrier wheel tracks 144a, 144b may be prevented.

Figure 7:
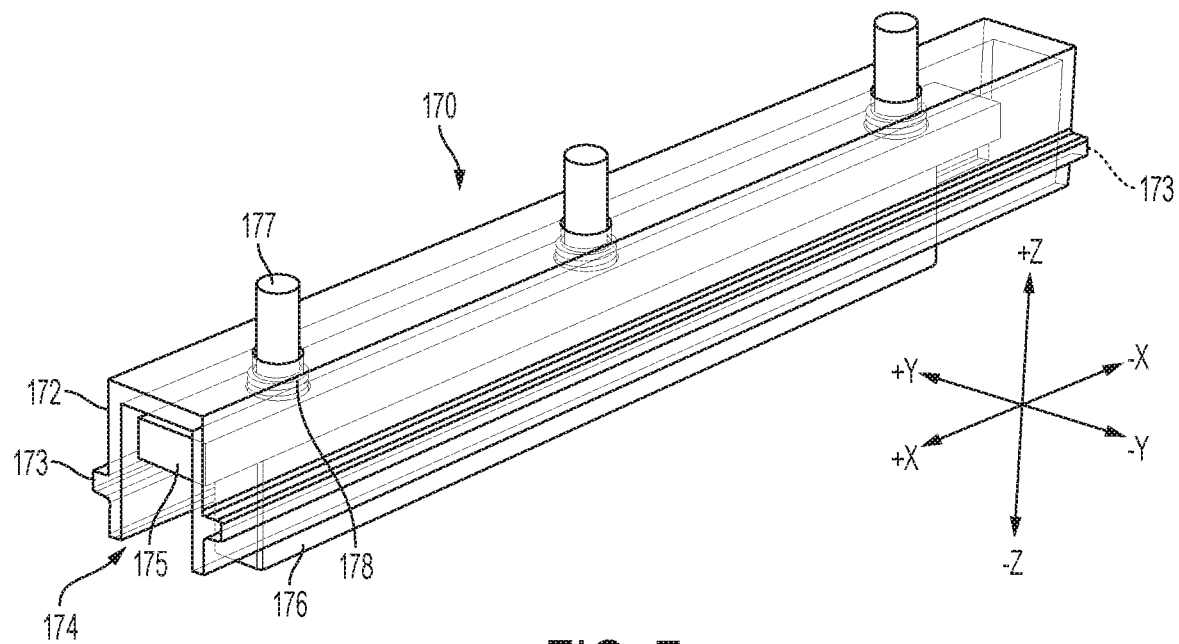
FIG. 7 depicts a perspective view of a locking mechanism, according to one or more embodiments shown and described herein.
Figure 8:
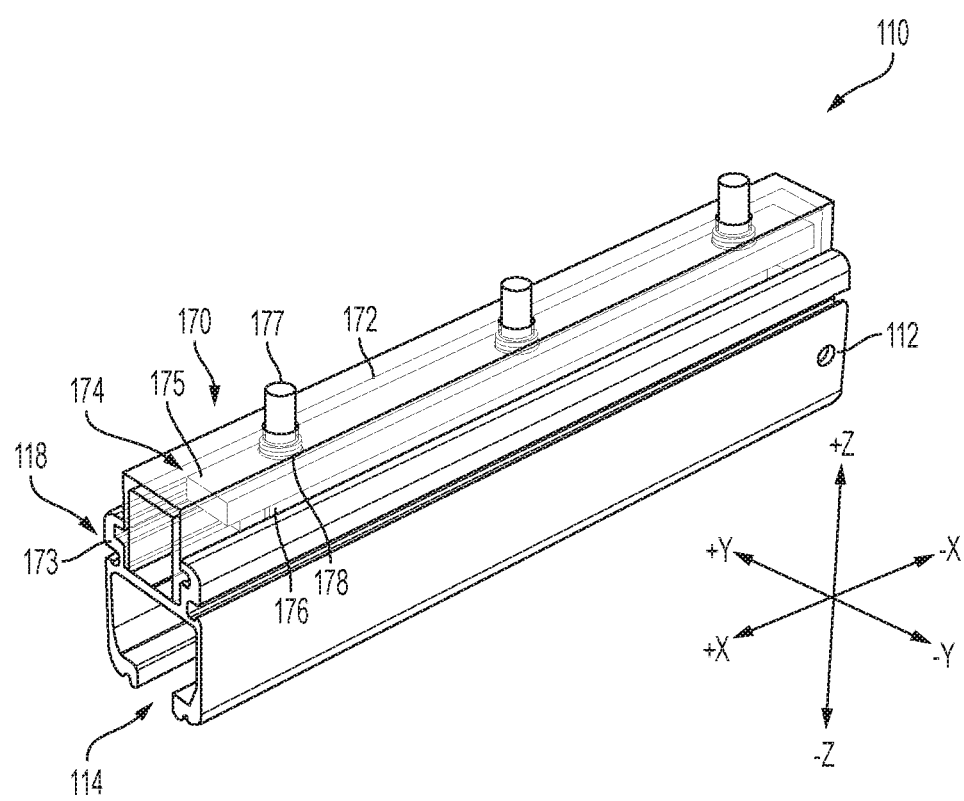
FIG. 8 depicts a perspective view of the locking mechanism of FIG. 7 coupled to the docking rail FIGS. 3A and 3B, according to one or more embodiments shown and described herein.

Referring again to FIG. 4, the docking rail adapter 130 may include an unlocking mechanism 150 that, as will be described in greater detail herein, is configured to unlock the locking mechanism 170 of the lift unit docking system 100, illustrated in FIGS. 7 and 8. The unlocking mechanism 150 may be coupled to the base 132 and extend above the carrier wheel track in the vertical direction. For example, in one embodiment, the unlocking mechanism 150 includes a support portion 151 that extends from the base 132 of the docking rail 110 in the vertical direction and an extending portion 154 that extends from the support portion 151 longitudinally over the lift unit carrier channel 133. That is, the extending portion 154 may be cantilevered over the lift unit carrier channel 133 by the support portion 151. The support portion 151 may be positioned proximate to an end of the carrier wheel track in the −X direction and may aid in limiting movement of the lift unit 40 in the −X direction when mounted on the docking rail adapter 130.

Referring to specifically to FIG. 5B, the extending portion 154 may be positioned above the lift unit carrier channel 133 a distance greater than or equal to a height of a portion of the carriage body 51 extending through the lift unit carrier channel 133 above the base 132 to provide clearance for mounting the lift unit 40 onto the docking rail adapter 130. It is noted that while the unlocking mechanism 150 is shown as having a particular form, other forms are contemplated and possible. For example, in some embodiments, the unlocking mechanism 150 may not include an extending portion 154, instead the support portion 151 may be sufficient to unlock the locking mechanism 170. Embodiments of the unlocking mechanism 150 will be discussed further with reference to the locking mechanism 170 and FIGS. 9-11D.

Referring again to FIG. 4, extending from the base 132 may be vertical sidewalls 157a, 157b that extend along the length of the base 132 in the longitudinal direction. To aid in alignment of the docking rail adapter 130 with the docking rail 110, the docking rail adapter 130 may include guiding elements. For example, the docking adapter may include wall guiding elements 147a, 147b positioned along the vertical sidewalls 157a and 157b. In some embodiments, the docking rail adapter 130 may include a lock guiding element 147c positioned along the vertical surfaces of the support portion 151 of the unlocking mechanism 150. The various guiding elements may include sloped walls side walls (e.g., 158a, 158b, 158c). The sloped sidewalls may guide alignment of the docking rail adapter 130 with the adapter receiving opening 116 and the lock opening 120 shown in FIGS. 3A and 3B.

Referring again to FIG. 1, the lift unit docking system 100 includes a vertical lifter 160. The vertical lifter 160 may include a telescoping column 161. For example, the docking rail adapter 130 may be coupled to an end of the telescoping column 161. The vertical lifter 160 may also include a moveable carriage 152, wherein the telescoping column 161 is coupled to the moveable carriage 152 such that it is able to be transported along with the moveable carriage 152. Accordingly, the moveable carriage 152 may include wheels 163 that allow the moveable carriage 152 to be moved along the floor 12.

Figure 6A:
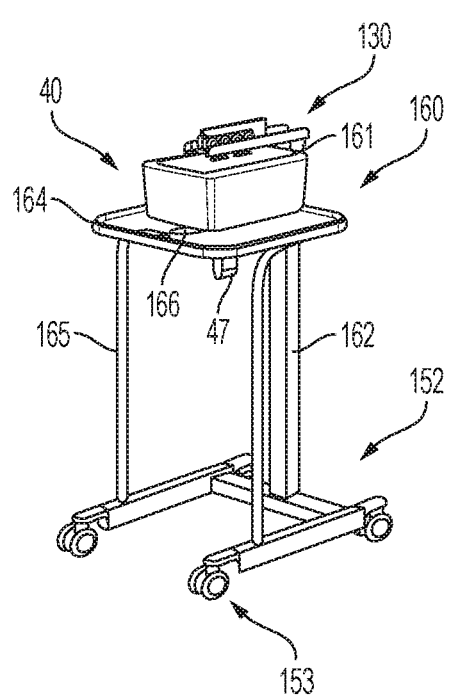
FIG. 6A illustrates a carriage for transporting a lift unit while supported on a docking adapter, according to one or more embodiments shown and described herein.
Figure 6B:
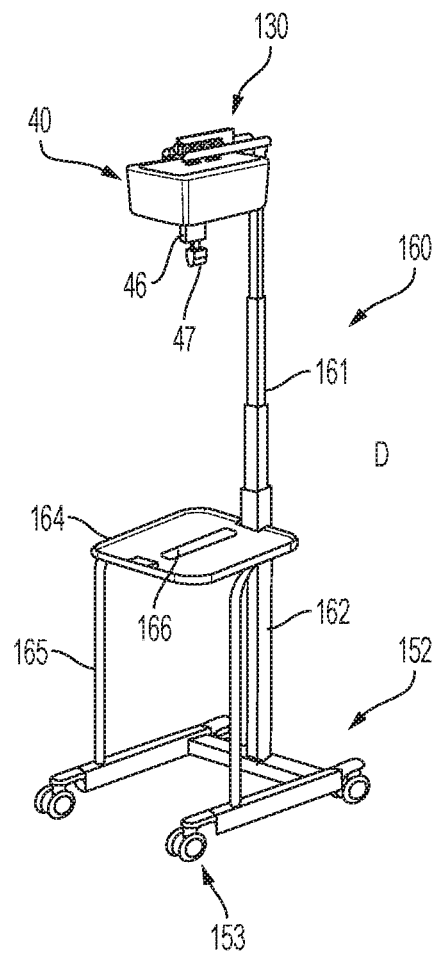
FIG. 6B illustrates a telescoping arm of the carriage for lifting to docking adapter and lift unit supported thereon, according to one or more embodiments shown and described herein.

FIGS. 6A and 6B illustrate the vertical lifter 160 with the docking rail adapter 130 coupled to the telescoping column 161 and supporting a lift unit 40 in a retracted configuration (FIG. 6A) and an extended configuration (FIG. 6B). In some embodiments, the vertical lifter 160 may include a table 164. The table 164 may be coupled to the moveable carriage 152 through one or more support legs 165. In some embodiments, the table 164 may also be supported by a base cladding 162 of the telescoping column 161. When in the retracted configuration, the lift unit 40, supported on the docking rail adapter 130, may be able to rest on the table 164. A hole 166 may be cut into the table 164 to allow the connector 47 of the lift unit 40 to extend therethrough when the lift unit 40 is supported on the table 164.

As noted above, FIG. 6B illustrates the docking rail adapter 130, supporting the lift unit 40 thereon, vertically lifted by telescoping column 161 to the extended configuration. The telescoping column 161 may move between the retracted configuration and the extended configuration manually, such as with a crank. In other embodiments, movement of the telescoping column 161 between the retracted configuration and the extended configuration may be power driven, for example, with a linear motor.

The moveable carriage 152 may include wheels 163 to allow the moveable carriage 152 to be moved between various locations. In some embodiments, the wheels 163 may be electrically powered, for example, the wheels 163 may be operatively coupled to and driven by a motor. The moveable carriage 152 may include additional features as well. For example, the moveable carriage 152 may include storage space (not shown) beneath the table 164. For example, additional tables, similar to table 164, may be positioned underneath table 164 to hold additional lift units. In some embodiments, an equipment cabinet (not shown) may be positioned beneath to table 164 for holding various items, such as, tools, spare parts, and the like. In some embodiments, the moveable carriage 152 may be weighted (e.g., carry additional weight), to counterbalance the weight of a lift unit 40 lifted to the extended position.

With reference to FIG. 1, the lift unit docking system 100 further includes a locking mechanism 170 that is repositionable between a locked position and an unlocked position, wherein the locking mechanism 170 is configured to block movement of a mounted lift unit 40 toward the adapter receiving opening 116 of the docking rail 110 when in the locked position. FIG. 7 illustrates the locking mechanism 170, according to one or more embodiments. The locking mechanism 170 includes a housing 172 and a lock 174 that is moveable in the vertical direction relative to the housing 172. The housing 172 is illustrated in ghost such that the rest of the locking mechanism 170 can be viewed through the housing 172. The housing 172 may include one or more projections 173. Referring to FIG. 8, the locking mechanism 170 is illustrated connected to the docking rail 110. Specifically, the projections 173 of the docking rail 110 form an interlocked connection with the upper rail portion 118 of the docking rail 110 such that the housing 172 cannot move relative to the docking rail 110 in the vertical direction.

Figure 9:
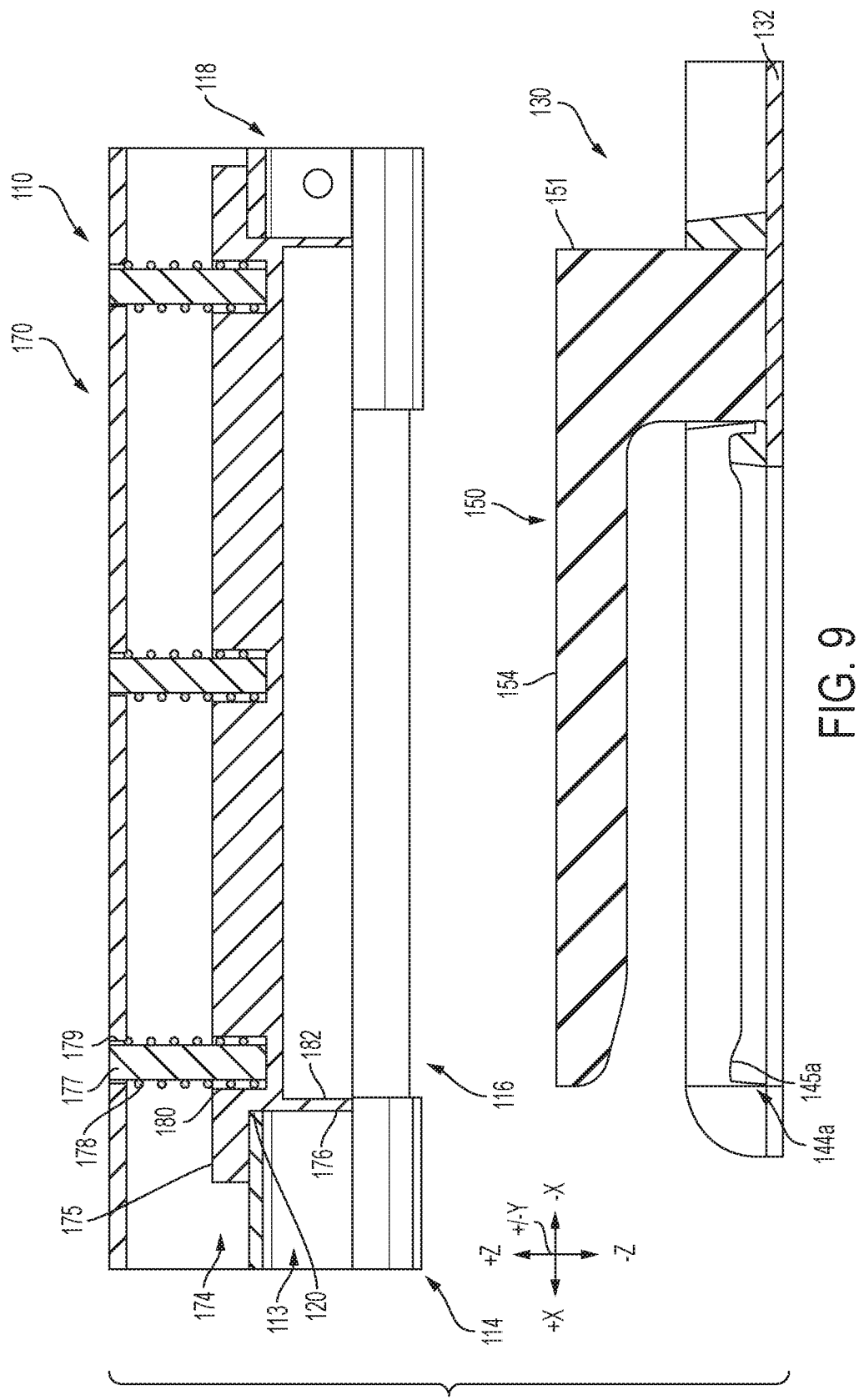
FIG. 9 depicts a cross-section view of the docking rail and locking mechanism of FIG. 7 with a docking rail adapter positioned below.

The lock 174 may include a retaining member 175, one or more guide pins 177, and a blocking member 176. The retaining member 175, the one or more guide pins 177, and the blocking member 176 may be formed integrally with one another or may be discrete components coupled to one another. The retaining member 175 may be configured to prevent motion of the lock 174 completely through the lock opening 120, shown in FIG. 9. FIG. 9 illustrates a cross section of the docking rail 110 with the lock 174 of the locking mechanism 170 positioned in a locked position. As shown, the retaining member 175 may be sized so as to be larger than the lock opening 120 formed in the docking rail 110 so as to be unable to pass through the lock opening 120, as shown. Accordingly, the retaining member 175 may prevent the entire lock 174 from traveling through the lock opening 120 when the lock is in the locked position.

Still referring to FIG. 9, in the locked position, the blocking member 176 extends into the channel 113 of the docking rail 110 and is operable to block movement of a mounted lift unit (not shown) toward the adapter receiving opening 116 in the longitudinal direction (−X). In this way, unintended dismounting of a mounted lift unit through the adapter receiving opening 116 may be prevented.

As noted herein, the lock 174 of the locking mechanism 170 may include one or more guide pins 177. The one or more guide pins 177 may extend from the retaining member 175 in the vertical direction. In some embodiments, the retaining member 175 may include one or more guide pin holes 180 formed therein in which the one or more guide pins 177 are positioned. The one or more guide pins 177 may extend from the retaining member 175 and through the housing 172. Accordingly, the housing 172 may include one or more guiding holes 179, through which the one or more guide pins 177 can extend. In this way, the guide pins 177 may maintain alignment of the lock 174 of the locking mechanism 170 as it moves between the locked and unlocked positions.

In some embodiments, the lock 174 of the locking mechanism 170 is biased to the locked position by one or more biasing members 178. For example, the one or more biasing members (e.g., a helical spring) may by disposed between the lock 174 and the housing 172. In some embodiments, the biasing element 178 may encircle the one or more guide pins 177 between the retaining portion 175 and the housing 172. When the lock moves to an unlocked position, such as shown in FIG. 11C, the biasing element may be compressed between the housing 172 and the retaining member 175. In some embodiments, the biasing element 178 encircling the one or more guide pins 177 may extend into the one or more guide pins holes 179, such that, when compressed in the unlocked position, the biasing element 178 may be compressed at least partially within the guide pin hole 179.

Still referring to FIG. 9, the lock 174 further includes the blocking member 176 which is configured to extend through the lock opening 120 of the docking rail 110. Accordingly, the blocking member 176 is sized to be able to move through the lock opening 120 in the vertical direction. As noted herein, the blocking member 176 is configured to prevent movement of a mounted lift unit 40 through the channel 113 of the docking rail 110 when in the locked position. The blocking member 176 may include a recess 182 formed therein. As will be described in greater detail, the recess 182 may be configured to receive the unlocking mechanism 150 of the docking rail adapter 130, which may then lift the lock 174 of the locking mechanism 170 into the unlocked position.

Figure 10A:
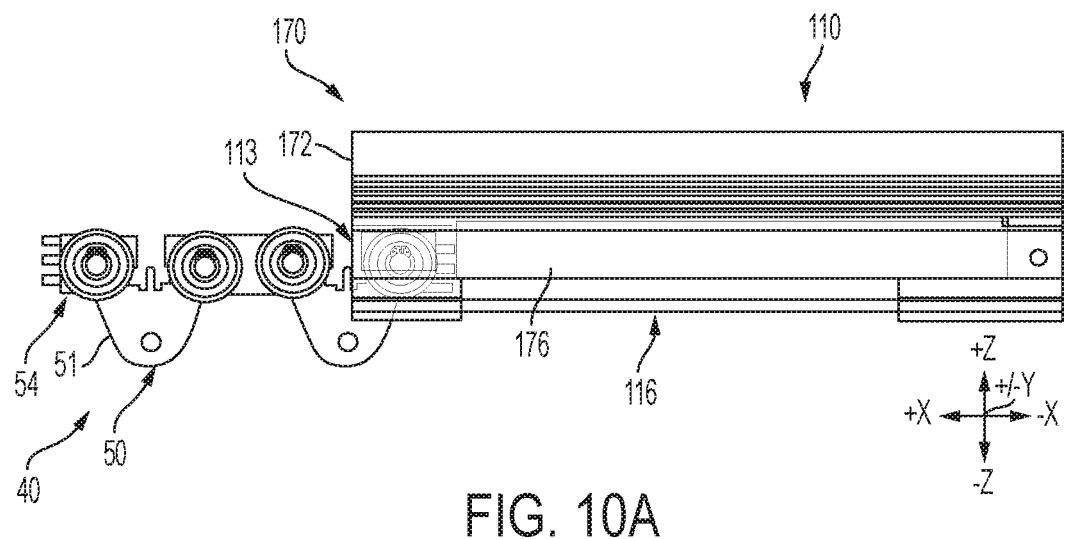
FIG. 10A schematically depicts side view of a carriage of a lift unit entering a locked docking rail, according to one or more embodiments shown and described herein.
Figure 10B:
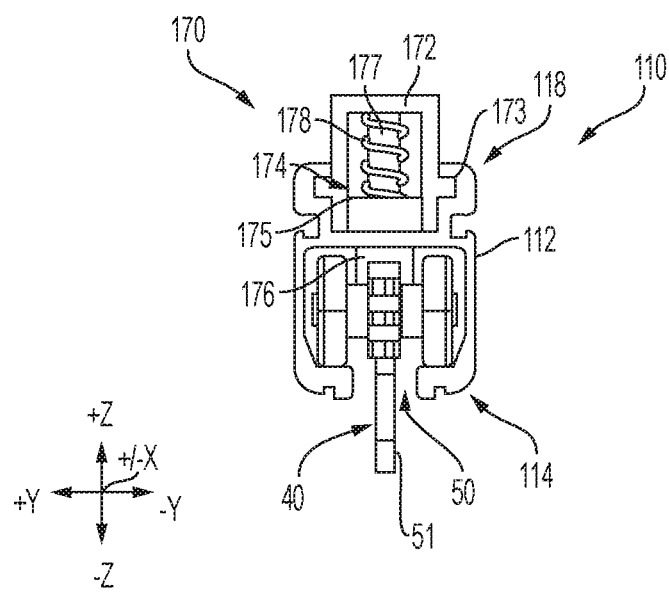
FIG. 10B schematically depicts a front view of the carriage and docking rail of FIG. 10A, according to one or more embodiments shown and described herein.

FIGS. 10A and 10B illustrate side and front views of a carriage 50 of a lift unit 40 attempting to enter the docking rail 110 wherein the locking mechanism 170 is in a locked configuration, respectively. In FIG. 10A, a portion of the docking rail 110 is illustrated in ghost such that a wheel of the lift carriage 50 of the lift unit 40 of the blocking member 176 of the locking mechanism 170 are able to be seen. As illustrated the blocking member 176 is preventing the lift carriage 50 of the lift unit 40 from moving longitudinally through the docking rail 110 and accessing the adapter receiving opening 116.

FIG. 11A-11D illustrate the unlocking of the docking rail 110 with the unlocking mechanism 150 of the docking rail adapter 130, which allows the lift carriage 50 of the lift unit 40 to move into the channel 113 of the docking rail 110 to be positioned first and second carrier wheel tracks 144a, 144b. In particular, 11A illustrates a side view of the docking rail adapter 130 contacting the body 112 of the docking rail 110 around the adapter receiving opening 116 (shown in FIG. 11D). A portion of the docking rail 110 is shown in ghost such that a wheel of the lift carriage 50 of the lift unit 40 is visible and a portion of the unlocking mechanism 150 is visible. Accordingly, when the docking rail adapter 130 interfaces with the adapter receiving opening 116 of the docking rail 110, the unlocking mechanism 150 extends into the docking rail 110 to contact and move the locking mechanism 170 out of the way of the lift carriage 50 of the lift unit 40 such that the lift unit 40 can move to be positioned on the docking rail adapter 130.

Figure 11A:
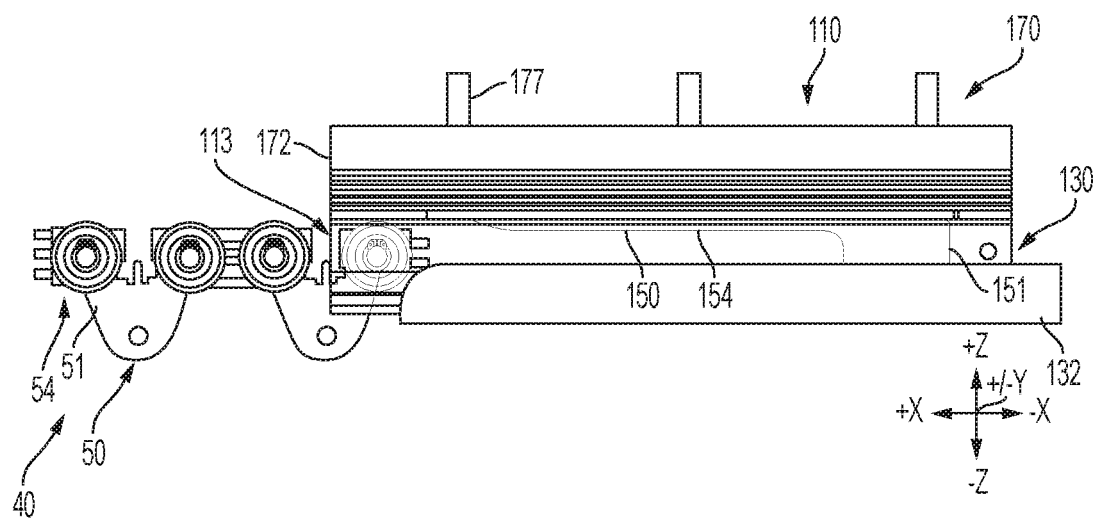
FIG. 11A schematically depicts a side view of a carriage of a lift unit entering and unlocked docking rail by a docking rail adapter, according to one or more embodiments shown and described herein.
Figure 11B:
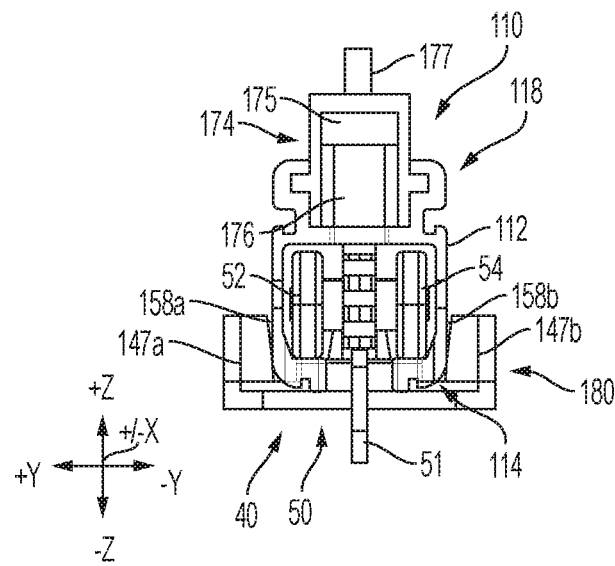
FIG. 11B schematically depicts a front view of the carriage, docking rail and docking rail adapter of FIG. 11A, according to one or more embodiments shown and described herein.
Figure 11C:
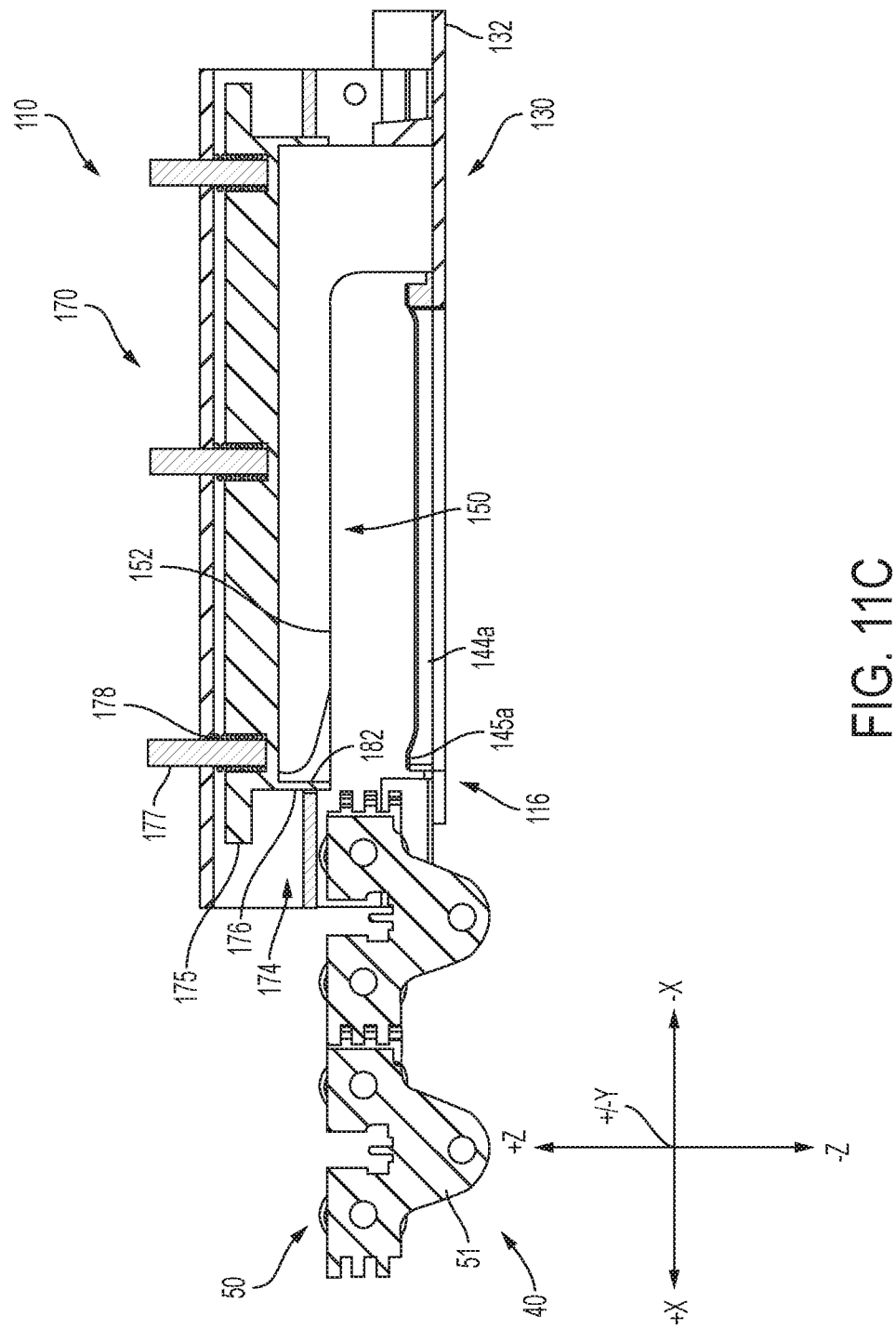
FIG. 11C depicts a cross section view of the carriage, docking rail, and docking rail adapter of FIGS. 11A-11B.

FIG. 11B illustrates a front view of the docking rail 110 and carriage 50 of FIG. 11A. As shown, the docking rail adapter 130 envelopes the lower rail 114 of the docking rail 110. Moreover the sloped walls 158a, 158b of the wall guiding elements 147a, 147b aid in guiding the docking rail adapter 130 into alignment with the docking rail 110. FIG. 11C illustrates a cross-section of FIG. 11A taken along the longitudinal axis. As shown, the unlocking mechanism 150 extends through the adapter receiving opening 116 of the docking rail 110 to interface with the blocking member 176 of the locking mechanism 170. In this case, the extending portion 154 of the unlocking mechanism 150 is positioned within recess 182 of the blocking member 176. Accordingly, when the docking rail adapter 130 moves to interface with the docking rail 110, the unlocking mechanism 150 contacts the lock of the unlocking mechanism 150 and pushes it up, through the lock opening 120, and further into the housing 172 of the locking mechanism 170. Accordingly, as shown, the one or more biasing members 178 are caused to compress between the retaining portion 175 and the housing 172. When the docking rail adapter 130 is removed, the one or more biasing members 178 will push the locking mechanism 170 back into the locked position, as shown in FIG. 9.

Figure 11D:
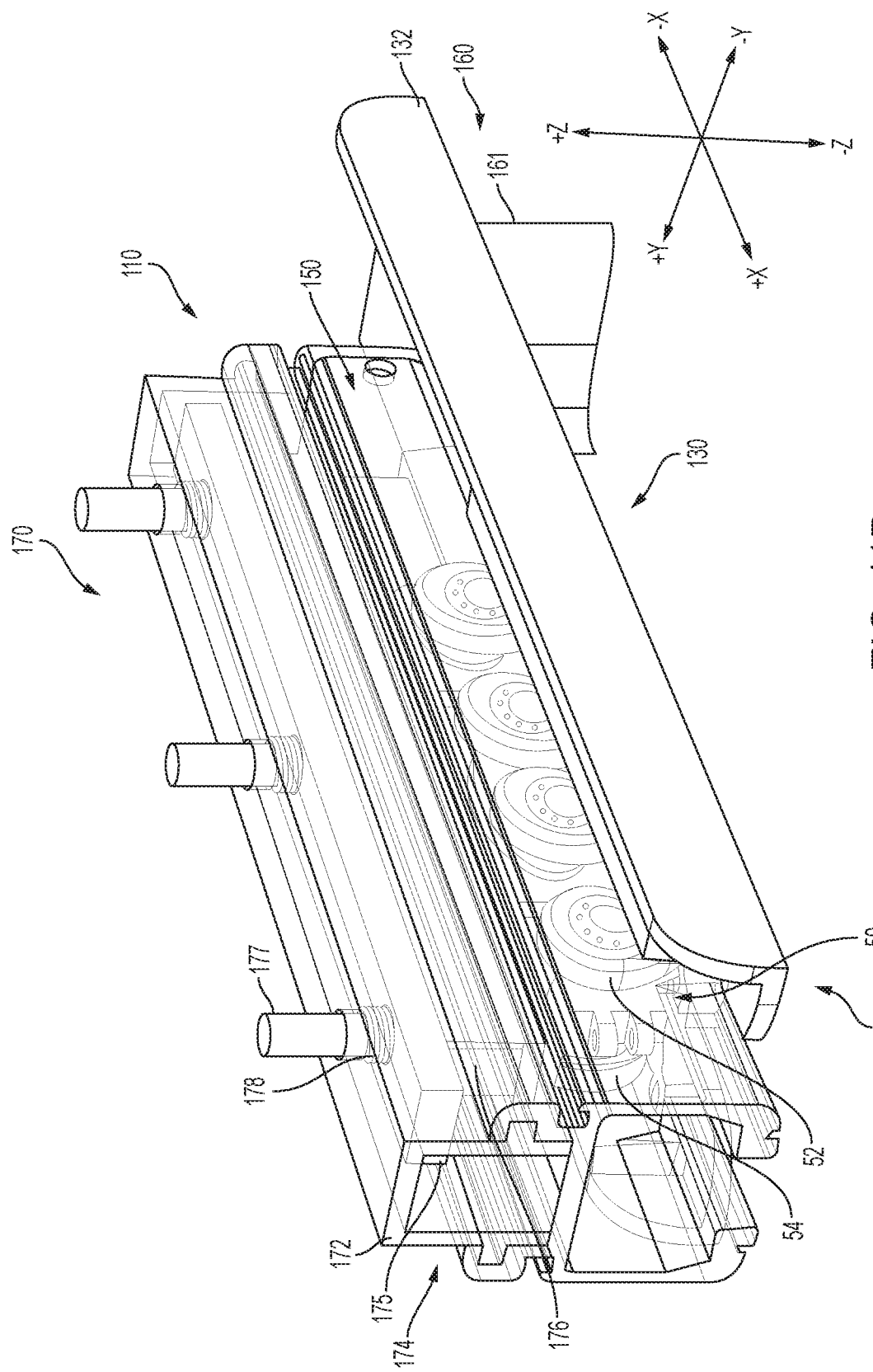
FIG. 11D depicts a perspective view of the carriage of FIGS. 11A-11C mounted on the docking rail adapter within the docking rail, according to one or more embodiments shown and described herein.

Still referring to FIG. 11C, the raised portion 145a of the carrier wheel track 144a may extend to a height of the lower rail 114 of the docking rail 110, such the lift carriage 50 of the lift unit 40 may smoothly transition from the lower rail 114 of the docking rail 110 to the carrier wheel track 144a of the docking rail adapter 130. FIG. 11D illustrates a perspective view of the lift carriage 50 of the lift unit 40 having moved from an unmounted position, shown in FIGS. 11A-C to a mounted position, wherein the lift carriage 50 is mounted onto the docking rail adapter 130. Accordingly, as described above, once mounted, the vertical lifter 160, which may be coupled to the docking rail adapter 130, may lower the lift unit 40, such that the lift unit 40 can be transported between overhead rail systems or maintenance can be performed on the lift unit 40.

It is noted that though the present disclosure is directed to overhead lift systems 100 that are used to transport subjects, such overhead lift systems 100 may be useful in other industries wherein objects, not limited to people, are moved using overhead lift systems 100.

It should now be understood that lift unit docking systems include and docking rail and a docking rail adapter that is repositionable relative to the docking rail to allow for the mounting and unmounting of lift units from an overhead rail. In some embodiments the lift unit docking system includes a locking mechanism that prevents mounted lift units from unintentionally dismounting off of the docking rail before the docking rail adapter is in place. In some embodiments, the docking rail adapter is mounted on a vertical lifter that lifts and lowers the docking rail adapter to and from the docking rail to easily mount and dismount lift units to an overhead rail. Accordingly, the lift unit docking systems as described herein allows for less intensive mounting and/or dismounting a lift unit from an overhead rail without the need to an operator to climb to a height of the overhead rail. As such, potentially hazardous conditions caused by climbing to such heights or the possibility of damaging the lift unit by dropping the lift unit from such a height may be avoided.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A lift unit docking system, comprising:
    a docking rail configured to provide ingress and egress of a lift unit to and from an overhead rail, the docking rail comprising a body defining a channel and an adapter receiving opening within the body;
    a docking rail adapter repositionable relative to the adapter receiving opening of the docking rail and configured to transport the lift unit into and out of the channel of the docking rail; and
    a vertical lifter configured to vertically lift the docking rail adapter to the adapter receiving opening of the docking rail,
    wherein the docking rail adaptor comprises a carrier wheel track configured to support the lift unit thereon and the carrier wheel track defining a raised portion positioned at a terminal end of the carrier wheel track such that the lift unit traverses the raised portion during ingress and egress of the lift unit to and from the carrier wheel track.

2. The lift unit docking system of claim 1, wherein the vertical lifter comprises a telescoping column coupled to the docking rail adapter.

3. The lift unit docking system of claim 1, wherein:
    the vertical lifter comprises a moveable carriage and a telescoping column coupled to the moveable carriage; and
    the docking rail adapter is coupled to the telescoping column.

4. The lift unit docking system of claim 1, the docking rail further comprising a locking mechanism operable to block a mounted lift unit from moving longitudinally through the docking rail and accessing the adapter receiving opening when the locking mechanism is positioned in a locked position.

5. The lift unit docking system of claim 1, wherein the docking rail adapter comprises:
   a base configured to contact the body of the docking rail around the adapter receiving opening when transporting the lift unit into or out of the channel of the docking rail; and
   the carrier wheel track is positioned on the base and configured to support the lift unit thereon.

6. The lift unit docking system of claim 5, wherein the carrier wheel track comprises a first carrier wheel track and a second carrier wheel track, and the raised portion is positioned at the terminal end of each of the first carrier wheel track and the second carrier wheel track.

7. A lift unit docking system, comprising:
   a docking rail configured to provide ingress and egress of a lift unit to and from an overhead rail, the docking rail comprising a body defining a channel and an adapter receiving opening within the body;
   a docking rail adapter repositionable relative to the adapter receiving opening of the docking rail and configured to transport the lift unit into and out of the channel of the docking rail;
   a locking mechanism repositionable between a locked position and an unlocked position, wherein the locking mechanism extends into the channel to block movement of a mounted lift unit toward the adapter receiving opening of the docking rail when in the locked position; and
   a vertical lifter configured to vertically lift the docking rail adapter to the adapter receiving opening of the docking rail,
   wherein the docking rail adaptor comprises a carrier wheel track configured to support the lift unit thereon and the carrier wheel track defining a raised portion positioned at a terminal end of the carrier wheel track such that the lift unit traverses the raised portion during ingress and egress of the lift unit to and from the carrier wheel track.

8. The lift unit docking system of claim 7, wherein:
   the docking rail further comprises a lock opening positioned opposite from the adapter receiving opening; and
   the locking mechanism comprises a lock that is configured to be positioned within the lock opening and move relative to the lock opening in a vertical direction between the locked position and the unlocked position.

9. The lift unit docking system of claim 8, wherein the docking rail adapter comprises a unlocking mechanism configured to extend into the channel of the docking rail, contact the lock of the locking mechanism, and move the lock of the locking mechanism to the unlocked position.

10. The lift unit docking system of claim 9, wherein the docking rail adapter comprises:
    a base;
    the carrier wheel track is positioned on the base, wherein the unlocking mechanism is coupled to the base and extends above the carrier wheel track.

11. The lift unit docking system of claim 7, wherein the docking rail adapter comprises:
    a base configured to contact the body of the docking rail around the adapter receiving opening when transporting the lift unit into or out of the channel of the docking rail; and
    the carrier wheel track is positioned on the base.

12. The lift unit docking system of claim 7, wherein the locking mechanism is biased to the locked position.

13. The lift unit docking system of claim 7, wherein:
    the docking rail further comprises a lock opening; and
    the locking mechanism comprises:
      a retaining member positioned within the housing and sized so as to be unable to pass through the lock opening;
      a lock extending from the retaining member and configured to be positioned within the lock opening and move relative to the lock opening in a vertical direction between the locked position and the unlocked position; and
      one or more biasing members configured to bias the lock to the locked position.

* * * * *